C. H. CLARK.
DUMP CAR.
APPLICATION FILED FEB. 17, 1910.
1,018,165.
Patented Feb. 20, 1912.
4 SHEETS—SHEET 1.
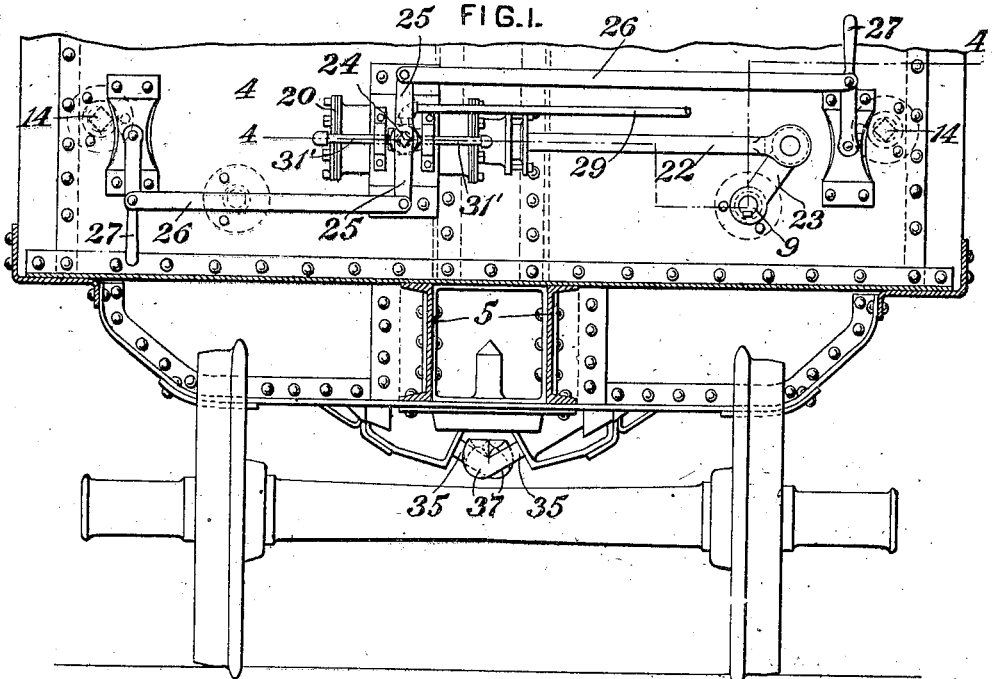
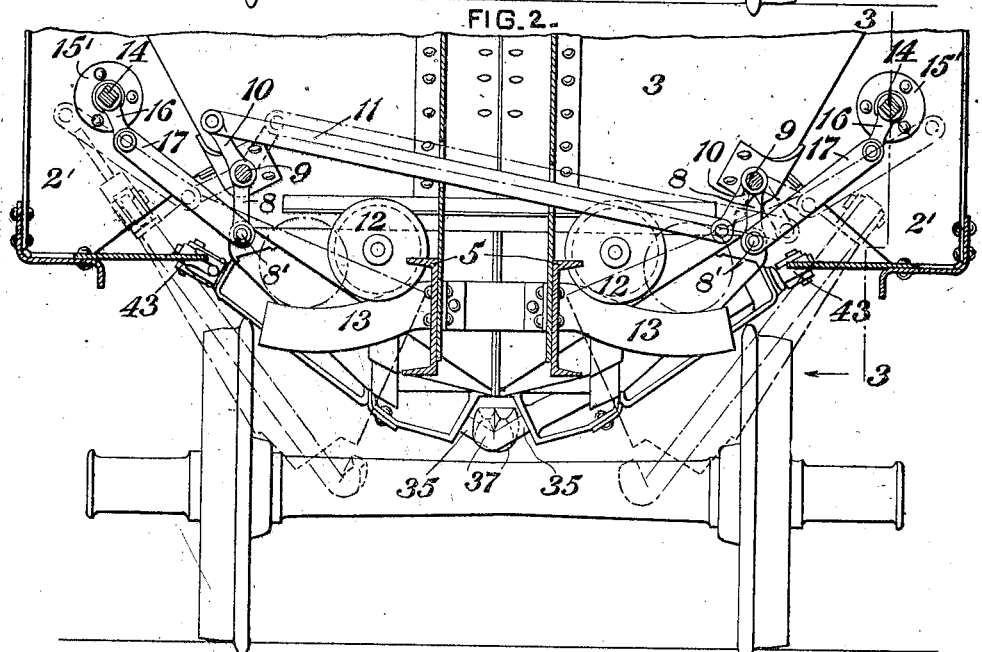
WITNESSES,
F. E. Gaither
Ella McConnell
INVENTOR,
Chas. H. Clark,
By Jeu Nesbit
Atty.

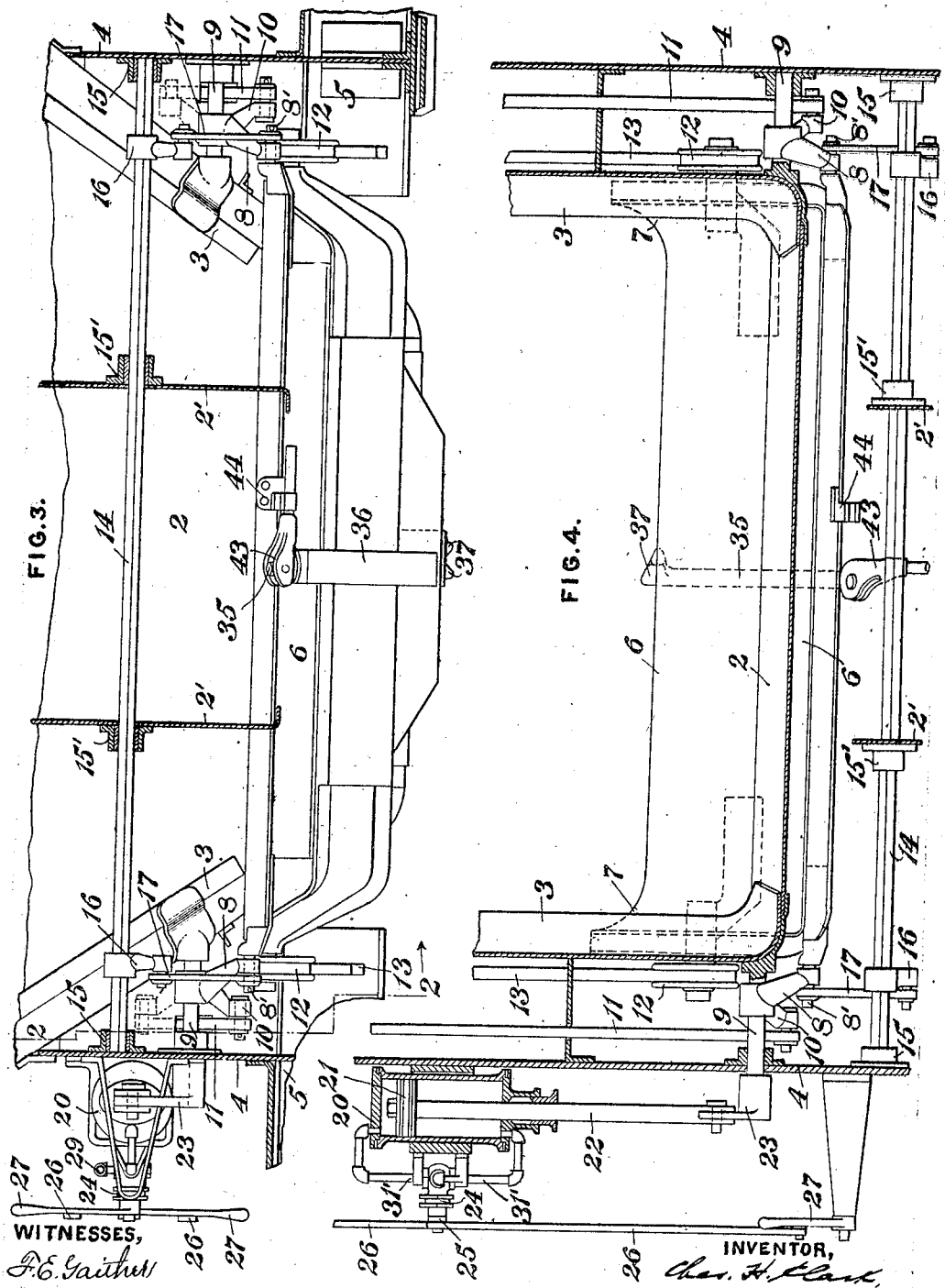

C. H. CLARK.
DUMP CAR.
APPLICATION FILED FEB. 17, 1910.
1,018,165.
Patented Feb. 20, 1912.
4 SHEETS—SHEET 3.
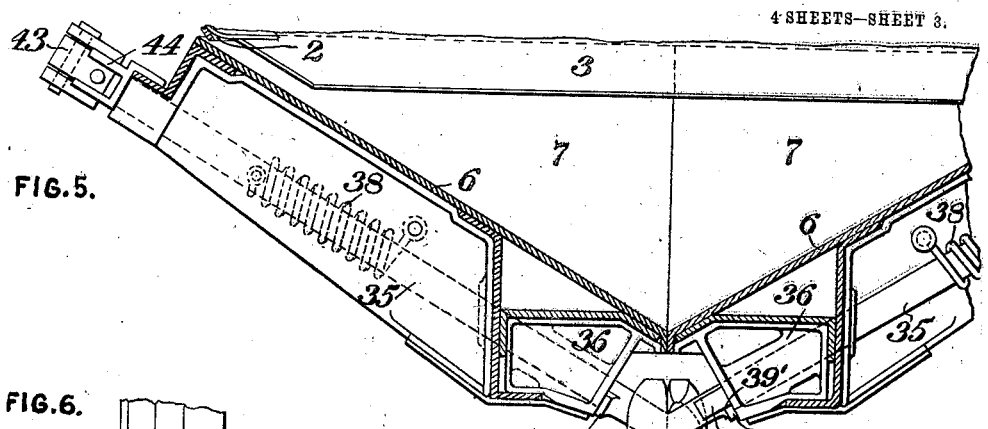
FIG. 5.
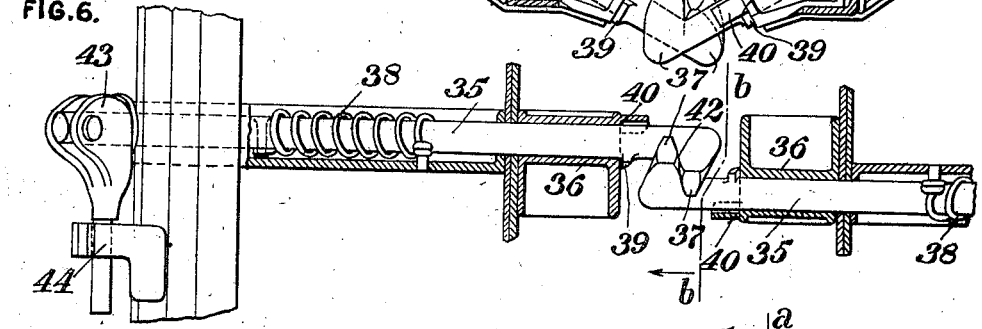
FIG. 6.
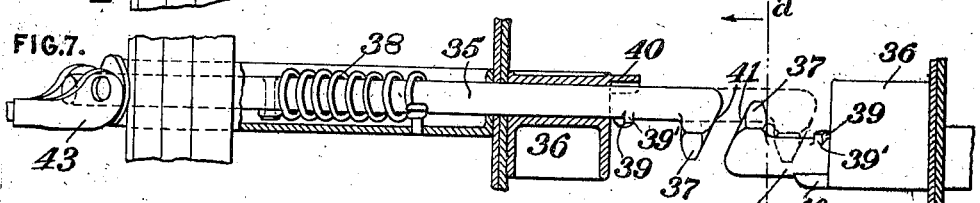
FIG. 7.
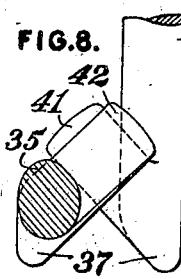
FIG. 8.
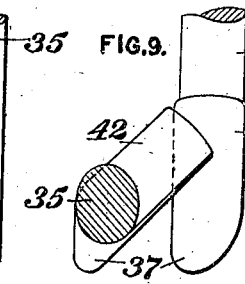
FIG. 9.   FIG. 10.
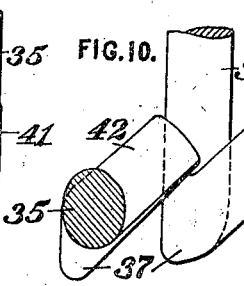
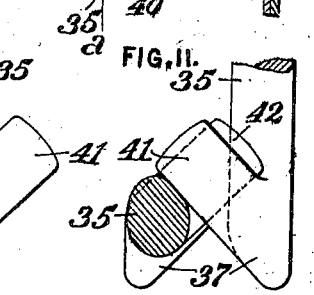
FIG. 11.
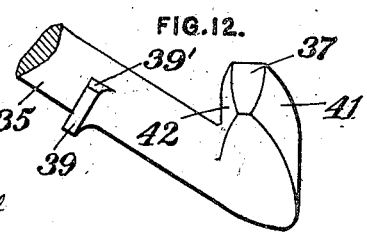
FIG. 12.
WITNESSES,
H. E. Gaither
Ella McConnell
INVENTOR,
Chas. H. Clark

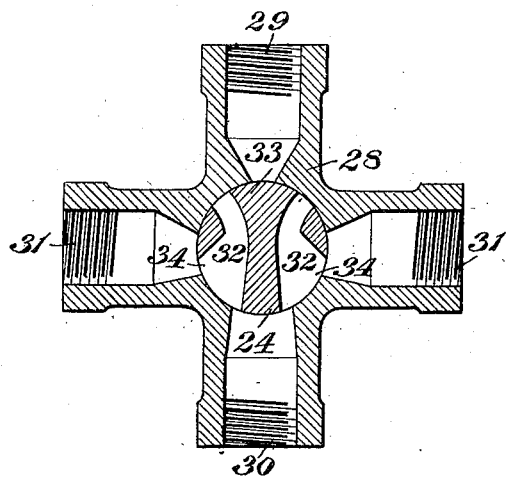
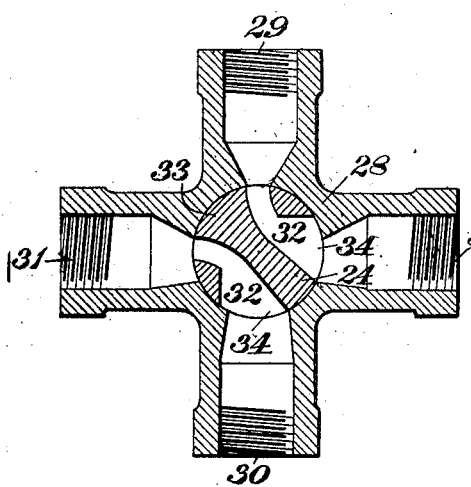
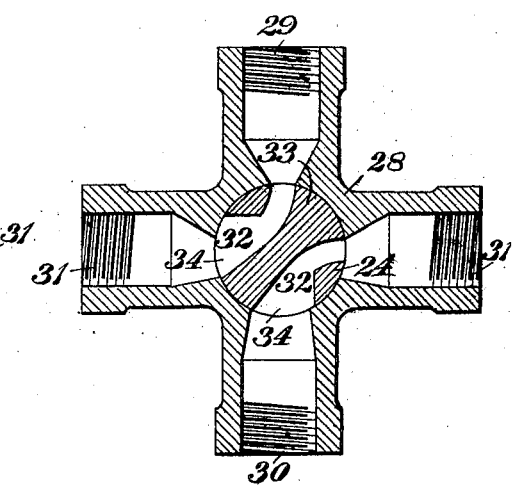

UNITED STATES PATENT OFFICE.

CHARLES H. CLARK, OF CRAFTON, PENNSYLVANIA, ASSIGNOR TO CLARK CAR COMPANY, OF PITTSBURGH, PENNSYLVANIA, A CORPORATION OF NEW JERSEY.

DUMP-CAR.

1,018,165.  Specification of Letters Patent.  Patented Feb. 20, 1912.

Application filed February 17, 1910. Serial No. 544,394.

*To all whom it may concern:*

Be it known that I, CHARLES H. CLARK, a resident of Crafton, in the county of Allegheny and State of Pennsylvania, have invented certain new and useful Improvements in Dump-Cars, of which the following is a specification.

One object of this invention is to provide for operating the doors of a dump car either by hand or by air power, the arrangement being such that the two operating means may be used interchangeably and without either means interfering with or retarding the other.

A further purpose is to so connect the operating means with each door as to avoid twisting and other strains which tend to distort the doors and prevent them from closing tightly. In the present embodiment the doors open outwardly, being of the bodily movable type, with their opposite ends connected to and receiving the same amount of force from the operating mechanism, relieving them of all torsional strains.

Still a further purpose is to provide locking mechanism of improved construction which may be operated at either side of the car for releasing both doors.

In the accompanying drawings, Figure 1 is a sectional end elevation of a dump car embodying the improvements, the same being taken outside the body bolster, and Fig. 2 is a similar sectional elevation taken inside the bolster on line 2—2 of Fig. 3. Fig. 3 is a sectional side elevation on line 3—3 of Fig. 2, the doors being closed. Fig. 4 is a sectional plan of one side of the car, taken on line 4—4 of Fig. 1, with the door open. Fig. 5 is a cross section of a portion of the double doors in closed position with the latches locked together, and Fig. 6 is a sectional plan of the same taken on the planes of the latch stems. Fig. 7 is a view like Fig. 6, with the latches disengaged. Figs. 8 to 11, inclusive, are sectional details of the latches, taken on line *a—a* of Fig. 7, illustrating their different relative positions when interlocked and when moving together or when separating, and Fig. 11 is a similar view on line *b—b* of Fig. 6, with the latches fully interlocked. Fig. 12 is a detail of one of the latches. Figs. 13, 14 and 15 are sections of the air controlling valve, Fig. 13 showing the valve in normal or neutral position; Fig. 14 when turned to admit air into one end of the cylinder; and Fig. 15 when turned to admit air into the opposite end of the cylinder.

The structures to which the present invention is directed are illustrated in connection with the door mechanism shown in Letters Patent granted to me November 9, 1909, No. 939,588, but it will be understood that the novel subject matter herein disclosed may be applied to doors of various types.

Referring to the drawings, 2 are the sloping side sheets and 3 the sloping end sheets of the hopper.

4 is the bolster, and 5 the draft sills. The bodily movable doors 6, disposed longitudinally of the car, are supported by their up-turned ends 7, the outer upper portions of said ends being pivotally secured to arms 8 of the stub crank shafts 9, bearings for these shafts being secured to the hopper and to bolsters 4, as shown. Other arms 10 on opposite shafts 9 are connected by link 11, arms 10 being so disposed as to cause the doors to move in unison when opening and closing. Wheels 12 journaled to the inner portions of the door-ends 7 travel on the track-like supports 13 secured to the draft sills. The construction thus far described is the same as in my above mentioned Letters Patent.

Extending longitudinally of the hopper at each side of the car outwardly from and preferably in a plane above stub shafts 9 are shafts 14 which are journaled in bearings 15 secured to bolsters 4, also in suitable bearings 15' on the diaphragms 2'. Two crank arms 16 on each of these shafts are connected by links 17 to the trunnions 8' on the door ends to which arms 8 of the stub shafts 9 are secured. These supplemental shafts 14 transmit the same force to both ends of the doors, resisting distorting strains and maintaining the doors so alined that they always close tightly together the entire length of their lower edges.

Shafts 14 are utilized for moving the doors by hand, being of square section their entire length, so that a wrench may be applied at any point on either shaft for either opening or closing both doors. All torsional strains are absorbed by the shafts during such operation, and the same is also true when operating the doors by air power, presently to be described. With the doors thus protected their efficiency and durability is greatly increased, and they move accurately and easily to and from closed position.

In some services it is desirable to provide means actuated by fluid pressure in addition to the hand means for operating the doors. Air under pressure is obtained for this purpose by suitable connection with an auxiliary reservoir of the air brake equipment, or with a train line, not shown. While I am not the first to utilize the brake air for this purpose, I believe I am the first to do so in connection with hand operating means; also the first to so arrange the air power means that when it is in normal position and ready to be operated, it does not in any way interfere with or retard either the opening or the closing movement of the doors. As here shown, a power cylinder 20 is secured to one of bolsters 4 with its axis extending transversely of the car, and with piston 21 thereof having its rod 22 connected to crank arm 23 secured to one of stub shafts 9. 24 is the controlling valve and secured thereto is arm 25 projecting in opposite directions, with links 26 extending from the arm extremities to the hand levers 27 supported by the bolster adjacent opposite sides of the car, so that the valve may be thrown from either side at the convenience of the operator.

28 is the casing in which valve 24 operates. While the valve and casing may be variously constructed, a desirable embodiment thereof is shown in detail in Figs. 13, 14 and 15. Referring thereto, casing 28 has at one side—say its upper side—the ported pipe connection 29 through which air is admitted from a reservoir or train line, not shown. At the bottom of the casing is outlet or exhaust 30. At opposite sides of the casing are ports 31 from which pipes 31' extend to opposite ends of cylinder 20. The valve 24 is formed with two like ports 32 of irregular form, with the upper ends of said ports separated by peripheral part 33 on the valve which fully covers inlet 29 when the valve is in normal or shut-off position, and with the lower portions of ports 32 so widened through the valve periphery, as indicated at 34, as to place the opposite cylinder ports 31 in register with exhaust 30. The result is that with both ends of the cylinder open to the exhaust when the air mechanism is inactive, piston 21 works easily in the cylinder in response to the movement transmitted through rod 22 and crank 23 without hindrance from either vacuum or air cushions, such as would occur in the cylinder if both ends thereof were not fully vented. Thus, when the doors open the piston moves freely; and the same is true when the doors are closed by hand or similarly shaken to dislodge material sticking in the car. But the air power mechanism is in constant readiness for use, it being only necessary to turn the valve by one or the other hand levers 27, placing the valve as shown in Fig. 14, or in Fig. 15, thus admitting air to either end of the cylinder for forcibly opening or closing the same. By oscillating either of levers 27 the doors may be opened and closed several times after the main load has been discharged as may be necessary for jarring loose any material that may not have passed out.

As here embodied, the locking mechanism consists of two latch stems 35 rotatably mounted in brackets 36 secured to the under sides of the doors, each stem being preferably in a plane parallel to the door. The inner lower ends of the latches project beyond the lower meeting edges of the doors, so that when the latter are closed the latches overlap and their hook-like extremities 37 play one on the other and firmly interlock when the doors are fully closed. A coiled spring 38 on each latch holds the same normally in the position it occupies when the latches are interlocked, as shown in Fig. 6, and opposes movement of the latches out of this position. The movement of each latch in opposition to its spring 38 may be limited by boss 39 secured to the latch stem just above hook 37 and cut away at 39' to afford limited movement with relation to lug 40 on bracket 36.

In order that either latch when free to turn may be deflected by and pass the other latch as the doors open and close, the inner side surfaces of hook extremities 37 are shaped to play one on the other, causing the released latch to turn when approaching as well as when moving away from the other latch. The outer portions of these surfaces, the portions that first engage when the doors are closing, are shaped to form the complementary oblique faces 41 which produce a wedging action, turning laterally the loosened latch against the pull of spring 38, as in Figs. 9 and 10. Inwardly from faces 41, the latch extremities are formed with complementary oblique faces 42, disposed reversely to faces 41, with the result that after faces 41 pass each other the loose latch, in response to the pull of spring 38, turns into locking engagement with the fixed latch, with faces 42 bearing against each other, as in Figs. 6 and 11. The angle of faces 42 is preferably less than the angle of friction, so that with arm 43 of either latch raised, as in Fig. 7, the released latch is free to turn, and the doors may move apart. When the latches are interlocked by the engagement of faces 42 and it is desired to secure the doors, the eccentric arm 43, pivoted to stem 35 and bearing against the outer end of bracket 36, is turned downward from the position shown in Fig. 7 to that shown in Fig. 6 and into the forked catch or holder 44, secured to the side of the door. This slight backward or outward longitudinal movement of the latch takes up all slack and draws and holds the doors tightly together.

It will be understood the latch mechanism is of the same construction on both doors and that the doors may be released and again locked by manipulating either latch, the latch not being manipulated being held fixed by its arm 43, with the surfaced hook-like extremity of such latch operating as a holding device over which the released latch moves or plays during the first portion of the opening movement of the doors and the final portion of the closing movement. Of course both latches may be released, but such double manipulation is unnecessary as it is one of the characteristics of the invention that the mechanism may be operated interchangeably through either of the latches.

The wedging together of the two latches upon turning down the eccentric arm of the latch that has been released, as above described, is most effective in imparting the final and complete closing movement, holding the doors thus tightly closed until released by loosening either latch. And with the latches midway the ends of the doors their meeting edges are held tightly together from one end to the other.

I claim:

1. The combination of a door for a dump car, fluid pressure means for opening and closing the door, and mechanism for locking and releasing the door actuated independently of the fluid pressure mechanism.

2. The combination of a door for a dump car, fluid pressure means and hand means operative interchangeably for opening and closing the door, and door locking and releasing mechanism operative independently of the door moving means.

3. The combination of a door for a dump car, fluid means and hand means operative interchangeably for opening and closing the door, and hand operated door locking means.

4. The combination of a bodily movable door for a dump car, fluid pressure means for opening and closing the door, and mechanism for locking and releasing the door movable independently of the door moving means.

5. The combination of oppositely moving doors for a dump car closing together at their inner edges, fluid pressure means and hand means operative interchangeably for moving the doors, and mechanism for locking and releasing the doors operative independently of the door moving means.

6. The combination of opposite bodily movable doors for a dump car closing together at their inner edges, fluid pressure door actuating means, and mechanism for locking and releasing the doors operative independently of the door moving means.

7. The combination of opposite doors for a dump car closing together at their inner edges, fluid pressure door actuating means, coöperating latches carried by the doors with either latch adapted to be deflected by the other latch when the doors move to and from closed position, and latch locking means.

8. The combination of opposite bodily movable doors for a dump car closing together at their inner edges, fluid pressure means and hand means operative interchangeably for moving the doors, coöperating latches carried by the doors with either latch adapted to be deflected by the other latch when the doors move to and from closed position, and latch locking means.

9. The combination of a dump car, bodily movable doors for the bottom opening thereof, separate devices for each door pivoted thereto and to a fixed portion of the car, shafts mounted on the car and extending longitudinally of the doors, and cranks on the shafts connected to the doors.

10. The combination of doors for a dump car, means for causing the doors to move in unison, fluid pressure means and hand means operative interchangeably for opening and closing the doors with the fluid actuated means normally out of position to retard the movement of the doors.

11. In a railway car, the combination of a door, fluid pressure means for opening and closing the door, other door actuating means, the fluid means including a valve for maintaining said means normally out of position to retard the movement of the door, whereby the fluid and said other means may be used interchangeably and the said other means used without being retarded by the fluid means.

12. The combination of a door for a dump car, and two mechanisms for moving the door operative interchangeably at any position of the door for imparting either opening or closing movement thereto.

13. In a dump car, the combination of a door having upturned ends, a shaft mounted on the car and extending longitudinally of the door with cranks on the shaft connected to the upturned door ends.

14. The combination of a dump car, bodily movable doors for the bottom opening thereof, tracks, wheels mounted on the doors and adapted to roll on the tracks, devices pivoted to fixed portions of the car and to portions of the doors for raising and lowering said door portions as the doors move from and toward closed position, shafts extending longitudinally of the doors—one shaft for each door, and cranks on the shafts connected to the doors.

15. The combination of a door for a dump car, fluid pressure means and means other than the fluid pressure means operative interchangeably for actuating the door, and mechanism operating to render the fluid pressure means operative and also operating to prevent said means from retarding the movement of the door when actuated by said other operating means.

16. The combination of a door for a dump car, a power cylinder, a piston in the cylinder operatively connected to the door, valve mechanism connected to opposite ends of the cylinder and provided with an inlet and an exhaust with both ends of the cylinder open to the exhaust when the cylinder and piston are inoperative, and means other than the cylinder and piston for actuating the door.

17. The combination of bodily movable doors for a dump car, crank shafts—one for each end of each door—with the cranks of said shafts connected to the doors, connecting means causing the doors to move in unison, a crank arm on one of said shafts, a power cylinder and piston with the piston connected to said crank arm, and valve mechanism for the cylinder.

18. The combination of bodily movable doors for a dump car, crank shafts—one for each end of each door—with the cranks of said shafts connected to the doors, connecting means causing the doors to move in unison, a crank arm on one of said shafts, a power cylinder and piston with the piston connected to said crank arm, valve mechanism for the cylinder, and shafts extending longitudinally of the doors with cranks on the shafts connected to the doors.

19. Opposite doors for a dump car, and latches mounted on the doors and deflected by each other.

20. Doors for a dump car, and independently movable coöperating latches deflected by the movement of the doors.

21. Doors for a dump car, and independently movable interlocking latches moved to and from position for interlocking by the movement of the doors.

22. Doors for a dump car, means causing the doors to move in unison, and independently movable coöperating latches moved by the doors into and out of position for coöperating.

23. Doors for a dump car, means causing the doors to move in unison, and independently movable interlocking latches moved by the doors into and out of position for interlocking.

24. Doors for a dump car, means causing the doors to move in unison, and interlocking latches movably mounted on the doors and moved by the doors into and out of position for interlocking.

25. A movable latch for a dump car, means opposing movement of the latch from locking position, a holding device engaged by the movable latch, the holding device and latch adapted to interlock and having surfaces which engage each other as the door moves toward closed position, one of said surfaces having two faces with one of the faces operating to deflect the latch during the first portion of the engagement of said surfaces, and the plane of the other face permitting the latch to interlock with the holding device.

26. A latch for a dump car door having rotary movement and provided with a hook-like extremity, means opposing movement of the latch from locking position, a holding device engaged by the latch with said device and the hook extremity of the latch having engaging surfaces one moving over the other as the door closes, one of said surfaces having two faces, one of said faces operating to turn the latch when the latch and holding device first engage each other, and the other face of said surface permitting the latch to interlock with the holding device.

27. A latch for a dump car door having limited rotary movement and provided with a locking extremity, means for turning the latch toward locking position, a holding device with which the latch extremity is adapted to interlock, the holding device and latch extremity having surfaces which engage each other as the door moves toward closed position, one of said surfaces having two faces, one face operating to deflect the latch during the first portion of engagement of said surfaces, and the other face of said surface permitting the latch to turn toward locking position and interlock with the holding device.

28. A rotatable latch for a dump car door having limited independent movement in the direction in which the door moves and formed with a locking extremity, means opposing rotation of the latch, a holding device with which the extremity of the latch interlocks, the holding device and latch extremity having surfaces which engage each other as the door moves toward closed position, one of the surfaces having two faces—one face in advance of the other—with the advancing face operating to turn the latch and the other face permitting the latch to move toward normal position, the plane of said other face causing the latch and holding device to tightly interlock when the latch is moved longitudinally, means for moving the latch longitudinally, and means for holding the latch against rotation.

29. Interlocking latches movably mounted on the oppositely moving doors of a dump car, means opposing movement of the latches out of locking position, the latches having surfaces which engage each other as the doors move toward closed position, said surfaces formed with complementary faces which operate to deflect one or the other of the latches as the doors move toward each other, and said engaging surfaces having other complementary faces which permit the latches to interlock when the doors are fully closed.

30. Interlocking latches rotatably mounted and movable longitudinally on the oppositely moving doors of a dump car, springs for rotating the latches toward interlocking position, the latches having surfaces which engage each other as the doors move toward closed position, said surfaces having complementary advancing faces which operate to turn one or the other of the latches against the force of the spring holding such latch, and said engaging surfaces having other complementary faces permitting the latches to interlock upon the full closing of the doors, and means for moving each latch longitudinally in a direction away from the other latch.

31. Latches rotatably mounted on oppositely moving doors of a dump car, the latches having limited longitudinal movement and provided with interlocking extremities, springs opposing rotation of the latches, the latches being in planes which cause side surfaces of their extremities to move one over the other as the doors close, said side surfaces having complementary advancing faces in planes which deflect one or the other of the latches as the doors move toward each other, and said surface having other complementary faces which permit the latches to move into full interlocking engagement upon the complete closing of the doors, means for moving each latch longitudinally in a direction away from the other latch, and means for holding each latch from rotating.

32. Latches rotatably mounted on the under sides of the oppositely moving doors of a dump car, the latches projecting beyond the inner edges of the doors and each latch provided with an upwardly disposed hook-like extremity, springs normally holding the latches with said extremities turned downwardly from vertical position, the hook extremities having side surfaces which engage each other as the doors move toward closed position, said surfaces having complementary advancing faces which deflect one or the other of the latches during the first portion of said engagement, said surface having other complementary faces which permit the latch extremities to fully interlock upon the complete closing of the doors, and means for holding each latch against rotation.

33. A rotatable and longitudinally movable latch for a dump car door, a holding device with which the latch interlocks when it rotates, an eccentric operating to move the latch longitudinally and tighten the interlocking connection, and means for holding the latch from rotating.

34. The combination of a dump car door having upwardly extending end portions which form walls for the door-closed space, and fluid pressure means for operating the door.

35. The combination of a dump car having upwardly extending end portions which form walls for the door-closed space, mechanism for operating the door, and mechanism for locking and releasing the door actuated independently of the door operating mechanism.

36. The combination of a dump car door having upwardly extending end portions which form walls for the door-closed space, and separate mechanisms operative interchangeably for moving the door.

37. The combination of a dump car door having upwardly extending end portions which form walls for the door-closed space, fluid pressure means and hand means operative interchangeably for moving the door, and door locking and releasing mechanism operative independently of the door moving means.

38. The combination of oppositely moving doors for a dump car closing together at their inner edges and with each door provided with upwardly extending end portions which form walls for the door-closed space, and fluid pressure means and hand means operative interchangeably for actuating the doors.

In testimony whereof I affix my signature in presence of two witnesses.

CHAS. H. CLARK.

Witnesses:
J. M. NESBIT,
F. E. CARTER.